Figure 1:
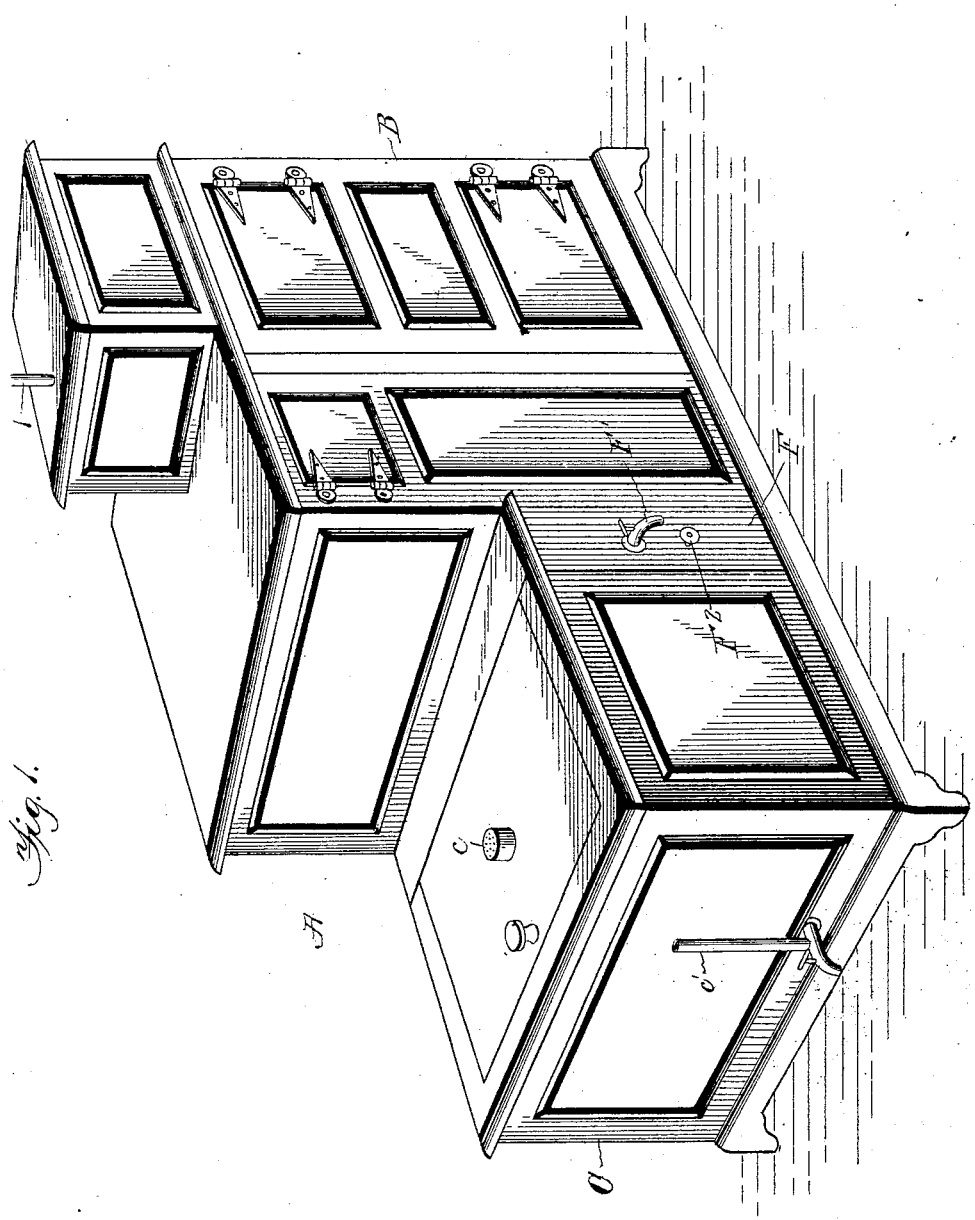

No. 685,786. Patented Nov. 5, 1901.
S. S. MONTANYE.
COMBINED HYGIENIC CREAMER AND REFRIGERATOR.
(Application filed May 9, 1901.)
(No Model.) 2 Sheets—Sheet I.

Witnesses:
J. Henry Kaiser
T. L. Mockabu

Inventor
Stanley S. Montanye
By
L. M. Marble
Attorney.

No. 685,786. Patented Nov. 5, 1901.
S. S. MONTANYE.
COMBINED HYGIENIC CREAMER AND REFRIGERATOR.
(Application filed May 9, 1901.)
(No Model.) 2 Sheets—Sheet 2.
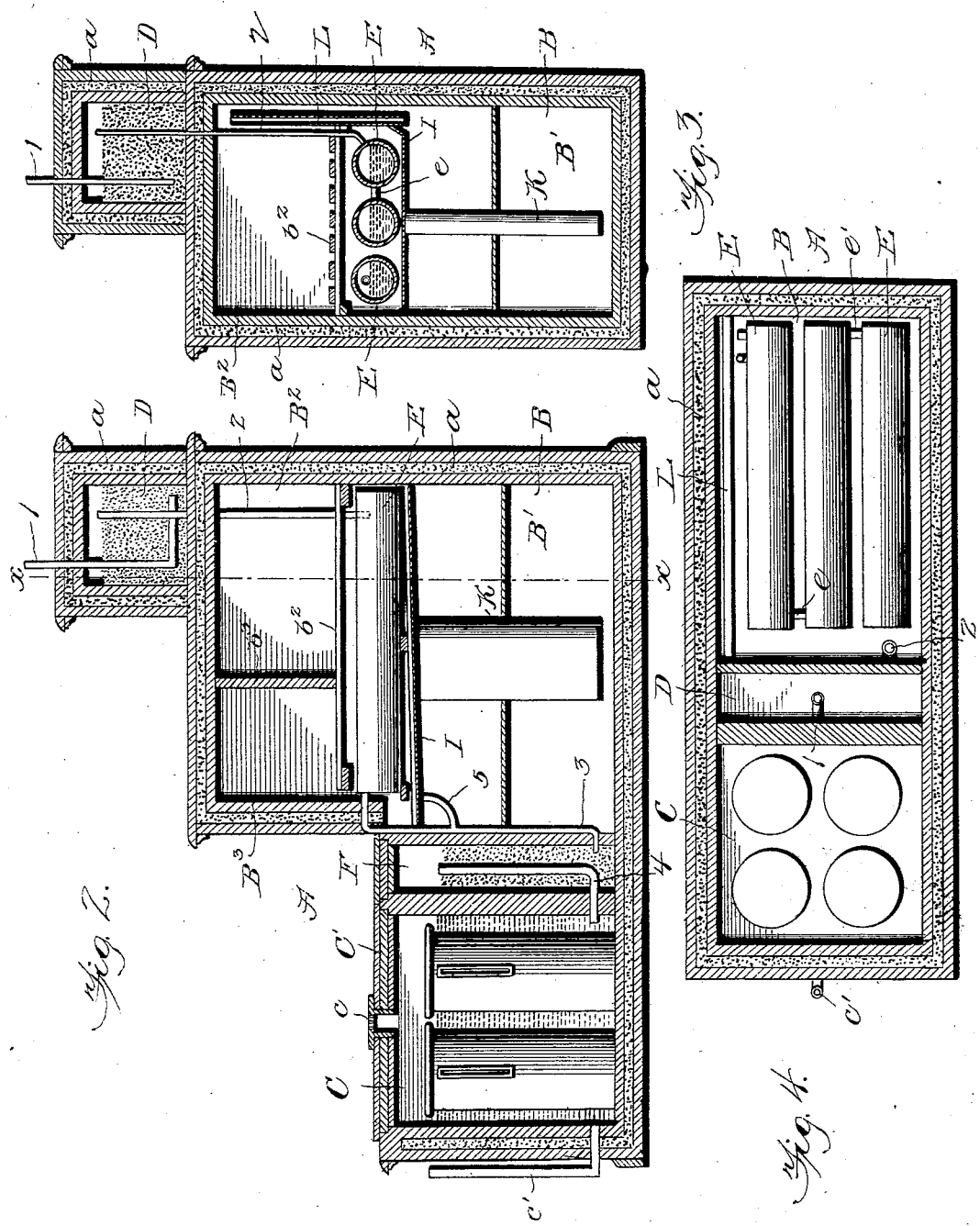
Witnesses:
J. Henry Kaiser.
T. L. Mockave
Inventor
Stanley S. Montanye
By
L. M. Marble
Attorney

UNITED STATES PATENT OFFICE.

STANLEY S. MONTANYE, OF CANTON, PENNSYLVANIA.

COMBINED HYGIENIC CREAMER AND REFRIGERATOR.

SPECIFICATION forming part of Letters Patent No. 685,786, dated November 5, 1901.

Application filed May 9, 1901. Serial No. 59,492. (No model.)

*To all whom it may concern:*

Be it known that I, STANLEY S. MONTANYE, a citizen of the United States, residing at Canton, in the county of Bradford and State of Pennsylvania, have invented certain new and useful Improvements in a Combined Hygienic Creamer and Refrigerator; and I do hereby declare the following to be a full, clear, and exact description of the invention, such as will enable others skilled in the art to which it appertains to make and use the same.

My invention relates to improvements in combined creamers and refrigerators; and it consists in a hygienic creamer and refrigerator, which will be hereinafter fully described, and particularly pointed out in the claims.

The objects of my invention are to simplify and render more compact combined creamers and refrigerators, to render such constructions thoroughly hygienic and free from impurity or taint which can in any way affect or injure the milk being treated, and to provide means for retaining the cooling-water in the refrigerator a sufficiently long time to enable it to exert its maximum refrigerating effect.

In accomplishing the objects of my invention I build the creamer and refrigerator chambers adjacent to each other and in the same framework, separated only by the filter used to purify the water used for the cooling process after it has passed through the refrigerator-chambers and before it passes through the creamer-chamber. The refrigerator-chamber itself is provided with a series of interconnected cylinders in direct connection with the source of water-supply, through which cylinders the cooling-water passes in a tortuous course before it passes into the creamer-chamber. The object in this construction is not only to retain the water in the refrigerator-chamber until it has exerted in its full the cooling properties it possesses, but also to assist in the formation of air-currents between the upper portion of the refrigerator-chamber, in which the cylinders are placed, and the lower portion of the same. By this use of the water-cylinders I greatly simplify, cheapen, and render more compact combined creamers and refrigerators and as a further result of the thorough and complete utilization of all of the cooling properties of the water and ice used in the refrigerator process insure economy in practice and lessen the quantity of water which has to be provided. This latter is a feature of no little importance in many places where the water has to be carried from a distance. By making the water-cylinders removable, so that they can be readily detached, removed, and cleansed, by providing a filter for filtering the water before its entrance into my combined creamer and refrigerator, and also a filter after the water has passed through the refrigerator-chamber and before it enters the creamer-chamber, I render my construction thoroughly hygienic and prevent the possibility of impurity or taint of any description reaching the milk being cooled. Further, the rapid cooling of the milk rendered possible by the operation of my device assists in removing from the milk any animal odors and taste of garlic.

Other features of my invention are the division of the refrigerator into two chambers separate and distinct from each other by an inclined floor, which also serves as an ice-drip to convey the drip from the ice-chamber, arranged in the upper chamber, into the water-circulating system of my construction, and the cold-air flue arranged in the bottom of this floor and extending nearly to the bottom of the lower refrigerator-chamber, whereby the cold air formed in the upper chamber is thoroughly utilized for cooling the lower chamber. Return air-flues are also provided.

My invention is fully illustrated in the drawings which accompany and form a part of this specification, in which the same reference letters and numbers refer to the same or corresponding parts, and in which—

Figure 1 is a perspective view of my combined refrigerator and creamer. Fig. 2 is a longitudinal section of the same. Fig. 3 is a transverse section taken on the line $xx$, Fig. 2. Fig. 4 is a top plan view with some parts removed, showing especially the arrangement of the cooling-cylinders.

Referring to the drawings, A represents the general framework of my construction, provided, as shown, with a suitable non-conducting lining $a$, in which are formed the refrigerator B and the creamer C. The refrigerator may be made only as one compartment;

but for convenience and general use it is formed into a lower chamber B', in which may be stored fruits, vegetables, meats, &c., which it is desired to keep cool, (shelves being provided, as shown, for this purpose,) an ice-chamber B², and a supplemental cooling-chamber B³ for general storing purposes, but particularly for the reception of pie, cake, bread, &c., which it is desired to keep near the ice, but not in actual contact with the same. Doors and covers are provided, as shown, for access to the several chambers.

The creamer C is for the purposes of this description of any ordinary construction of sufficient size to permit the placing therein of a desired number of milk-cans and provided with a ventilation-opening $c$ for the escape from the creamer of animal odors and also a supply of fresh air. It is also provided with a cover C' and a discharge-pipe $c'$.

My creamer and refrigerator belongs to the class of such constructions which are particularly for use on farms and places where simple methods of cooling must be resorted to. In combined refrigerators and creamers of this class the cooling is effected mainly by flowing water brought, if possible, direct from a spring, but often by force of necessity having to be carried from a distant point. The cooling action of the water is aided in cases where the water is not of itself sufficiently cold by the use of ice in the chamber through which the water passes, though for hygienic reasons the ice-chamber is separate from the creamer and the water is treated before it enters the creamer. The economical use of the cooling-water is in these constructions a necessity in practical use, and it is in the water-circulation system which I use that a chief feature of novelty of my invention resides.

The water-circulating system comprises two filters, one for filtering the water before its entrance into my creamer and refrigerator and the other for filtering the water after it has passed through the refrigerator and before it enters the creamer, a series of interconnected cylinders in the refrigerator, and the necessary pipes and connections.

The cooling-water enters my construction through the pipe 1 and passes into the filter D, from which it emerges through the pipe 2 and passes into the interconnected cylinders E. After passing through these cylinders it passes by means of the pipe 3 into the filter F, from whence it is conducted by the pipe 4 into the bottom of the creamer, final escape from the creamer being effected through the drain-pipe $c'$. To permit the drawing of water for domestic use, the filter F is provided, as shown, with the draw-faucet F' and the stop-cock F².

The cylinders E, which form so prominent a part in the cooling system, are ordinary cylinders connected at opposite ends by pipes $e$, so that the water in passing through the cylinders passes from end to end of each cylinder and is retained in the refrigerator for a relatively long time. In this way the water is enabled to exert its maximum cooling effect. The cylinders are slightly separated from each other, as shown, to facilitate the formation of cooling-currents of air to pass from the upper chambers through the flue K into the lower refrigerator B'. A return-flue L is provided, as shown. The cylinders are cooled mainly by the water passing through them, but also by the action of the ice in the ice-chamber B² and the drip from the ice which falls on them and after trickling over their surface falls into the inclined floor and division I. By reason of the inclination of the floor I the water is conducted through the mediation of the pipe 5 into the water-circulating system. The floor $b^2$ of the ice-chamber is formed of slats, as shown, and a partition $b^3$ is used to separate the compartment B³ from the ice-chamber B².

The cylinders E are so joined and connected that they may be readily removed and cleansed, and each and every part of my construction is made with a view to rendering easy washing and scrubbing. The maintaining in a sanitary condition a refrigerator and creamer is an indispensable requisite for satisfactory use, and this fact has been thoroughly considered in the construction and arrangement of the several parts.

It will be seen that by the construction thus provided a very complete utilization of the cooling-water is rendered possible, resulting not only in good service, but in the possibility of getting along with the use of very much less water than is required in some constructions.

I do not limit myself to the details of the construction herein shown and described; but

What I claim as new, and desire to secure by Letters Patent, is—

1. In a combined hygienic creamer and refrigerator, the combination with a refrigerator-chamber, a creamer-chamber, and a water-circulating system connecting the same, of a series of interconnected cylinders in said refrigerator-chamber, and means for connecting the same with said water-circulating system, whereby said cylinders serve not only to retain the cooling-water for a relatively long period of time in the refrigerator-chamber, but by reason of their extended surface act to facilitate the cooling action of said water, substantially as described.

2. In a combined hygienic creamer and refrigerator, the combination with a refrigerator-chamber, a creamer-chamber, and a water-circulating system connecting the same, of a series of interconnected cylinders in said refrigerator-chamber, the connections being so arranged that the water flows through the entire length of each cylinder, and means for connecting said cylinders with said water-circulating system, whereby said cylinders serve not only to retain the cooling-water for a relatively long period of time in the refrigerator-chamber, but by reason of their extended surface act to facilitate the cooling action of said water, substantially as described.

3. In a combined hygienic creamer and refrigerator, the combination with the refrigerator-chamber, a creamer-chamber and a water-circulating system connecting the same, of a series of interconnected cylinders in said refrigerator-chamber, means for dividing the refrigerator-chamber into two parts of chambers below said cylinders, an ice-receiver in said upper refrigerator-chamber, cold-air inlets and outlets connecting the upper and lower refrigerator-chambers, and means for connecting the cylinders with the water-circulating system, substantially as described.

4. In a combined hygienic creamer and refrigerator, the combination with a refrigerator-chamber, a creamer-chamber, and a water-circulating system connecting the same, of a series of interconnected cylinders in said refrigerator-chamber, an inclined floor for dividing the refrigerator-chamber into two parts of chambers below said cylinders, said floor serving as an ice-drip, means for connecting the same with the water-circulating system, an ice-receiver in said upper refrigerator-chamber, cold-air inlets and outlets connecting the upper and lower refrigerator-chambers, and means for connecting the cylinders with the water-circulating system, substantially as described.

5. In a combined hygienic creamer and refrigerator, the combination with a refrigerator-chamber, a creamer-chamber, and a water-circulating system connecting the same, of a series of interconnected cylinders in said refrigerator-chamber, an inclined floor for dividing the refrigerator-chamber into two parts or chambers below said cylinders, said floor serving as an ice-drip, means for connecting the same with the water-circulating system, the cold-air passage K for conveying the refrigerated air from the upper to the lower refrigerator-chambers, a cold-air outlet for the lower refrigerator-chamber, and means for connecting the cylinders with the water-circulating system, substantially as described.

6. In a combined hygienic creamer and refrigerator, the combination with a refrigerator-chamber, a creamer-chamber, and a series of interconnected cylinders in said refrigerator-chamber, of means for connecting said cylinders with the source of water-supply, a filter arranged between the creamer and refrigerator chambers, means for connecting the cylinders with said filter, and means for connecting said filter with the creamer-chamber, whereby a water-circulating system is provided adapted to serve not only to cool the refrigerator-chamber but to cool the creamer-chamber, substantially as described.

7. In a combined hygienic creamer and refrigerator, the combination with a refrigerator-chamber, a creamer-chamber, and a series of interconnected cylinders in said refrigerator-chamber, of an inclined floor for dividing the refrigerator-chamber into two parts below said cylinders, an ice-receiver in said upper refrigerator-chamber, cold-air inlets and outlets connecting said upper and lower refrigerator-chambers, means for connecting said cylinders with the water-supply opening, a filter arranged between the refrigerator and creamer chambers, means for connecting said cylinders with said filter and said filter with said creamer-chamber, whereby a water-circulating system is provided adapted to serve not only to cool the refrigerator-chamber, but to cool the creamer-chamber, substantially as described.

In testimony whereof I affix my signature in presence of two witnesses.

STANLEY S. MONTANYE.

Witnesses:
JENNIE A. OWEN,
E. J. CLEVELAND.